United States Patent [19]
Rooney et al.

[11] Patent Number: 5,349,021
[45] Date of Patent: Sep. 20, 1994

[54] THERMOSETTING PRINTING INK COMPOSITION

[75] Inventors: John M. Rooney, Basking Ridge, N.J.; Narendra M. Patel, Mt. Pocono, Pa.; Albert A. Kveglis, Pine Brook, N.J.; Robert J. Catena; Leonard Di Leo, both of Belleville, N.J.; Selcuk Avci, Clifton, N.J.

[73] Assignee: Sun Chemical Corporation, Fort Lee, N.J.

[21] Appl. No.: 71,802

[22] Filed: Jun. 2, 1993

[51] Int. Cl.$^5$ .............................................. C08K 5/06
[52] U.S. Cl. .................................... 524/761; 524/539; 524/878; 524/860; 524/861; 524/863; 524/785; 524/783; 524/787; 524/765; 524/789; 524/762; 524/766; 524/788; 524/786; 524/763; 524/795
[58] Field of Search ............... 524/539, 878, 860, 861, 524/863, 785, 783, 787, 765, 761, 762, 766, 788, 789, 786, 763, 795

[56] References Cited

U.S. PATENT DOCUMENTS

| | | | |
|---|---|---|---|
| 3,583,941 | 6/1971 | Trapasso | 260/75 |
| 3,945,631 | 3/1976 | Blank | 260/29.4 UA |
| 4,370,441 | 1/1983 | Gaske | 524/539 |
| 4,465,712 | 8/1984 | McVie | 427/387 |
| 4,501,854 | 2/1985 | Singer | 525/162 |
| 4,588,770 | 5/1986 | Würminghausen et al. | 524/788 |
| 4,732,929 | 3/1988 | Chang et al. | 524/783 |
| 4,766,163 | 8/1988 | Strudwick | 523/509 |

Primary Examiner—Melvyn I. Marquis
Assistant Examiner—Karen A. Dean
Attorney, Agent, or Firm—Jack Matalon

[57] ABSTRACT

A thermosetting printing ink composition comprising a functional copolymer of a thermosettable polyester and a polysiloxane, a pigment, a crosslinking agent and a curing catalyst which may be a strong acid or a metal salt thereof. The composition desirably also includes a reactive diluent such as a glycol, glycol ether or alcohol. The compositions are especially useful for imprinting metal containers such as beer and soda cans.

11 Claims, No Drawings

THERMOSETTING PRINTING INK COMPOSITION

FIELD OF THE INVENTION

This invention relates to thermosetting printing ink compositions which are especially useful for imprinting metal containers such as beer and soda cans. The composition comprises a functional copolymer of a thermosettable polyester and a polysiloxane, a pigment, a crosslinking agent and a catalyst which may be a strong acid or a metal salt thereof. The composition desirably also includes a reactive diluent and one or more conventional fillers.

BACKGROUND OF THE INVENTION

Thermosetting coating compositions containing one or more thermosettable polyesters, an aminoplast resin crosslinking agent and a curing catalyst consisting of a strong acid are well known. Such prior art compositions may be used as printing inks by incorporating pigments and appropriate solvents therein. It has now been found that if a functional, i.e. reactive, copolymer of a thermosettable polyester and a type of polysiloxane is used instead of the polyester, the resultant ink composition possesses improved pigment wetting, reduced initial shear viscosity, lower contact angle and lower surface tension. The printing ink compositions of the present invention also exhibited improved transfer and laydown, higher gloss and increased color strength.

U.S. Pat. No. 4,370,441 discloses a coating composition containing three components: an essentially nonfunctional organic solvent-soluble silicone resin reaction product of a highly branched, low molecular weight hydroxy-functional polyester with an hydroxy or alkoxy-functional polysiloxane; a second component consisting of an organic solvent-soluble, essentially linear, low molecular weight, hydroxy-functional polyester and a heterocyclic aminoplast resin for curing the second component.

The compositions of the aforesaid '441 patent are prepared such that, upon curing, no significant combination of the nonfunctional polyester-silicone reaction product with either the reactive polyester or the aminoplast resin will occur, i.e. stratification of the coating will occur and the silicone will rise to the coating surface to provide the desired weather resistance. In contrast thereto, the compositions of the present invention are prepared such that the polyester-silicone copolymer is functional, i.e. reactive in nature, and such copolymer will combine with the crosslinking agent.

DETAILS OF THE INVENTION

The thermosetting printing ink compositions of the present invention comprise:
(a) a functional copolymer of a thermosettable polyester and a polysiloxane having the general formula:

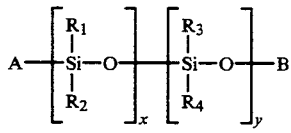

wherein x is an integer having a value of 0 to about 250 and y is an integer having a value of 1 to about 500; A, $R_1$, $R_2$ and $R_3$ are independently hydrogen, or $C_1$-$C_{10}$ branched or straight chain alkyl or aryl; and $R_4$ is a reactive functionality selected from the group consisting of $C_1$-$C_{10}$ branched or straight chain alkoxy, branched or straight chain alkylhydroxy, branched or straight chain alkylene oxide, epoxy; —RSH, —RNH$_2$ and —RCO$_2$H wherein R is a $C_1$-$C_{10}$ branched or straight chain alkyl, aryl, aralkyl, alkaryl or cycloalkyl; and B is an end cap group selected from the group consisting of $C_3$-$C_{10}$ trialkyl silyl and $C_{18}$-$C_{30}$ triaryl silyl;

(b) a pigment;
(c) a crosslinking agent; and
(d) a curing catalyst comprising a strong acid or metal salt thereof.

The functional, i.e. reactive, copolymer employed in the present invention may be either a graft or block copolymer, i.e. the polysiloxane may be grafted onto a previously-prepared thermosettable polyester or the monomers which would otherwise be employed in preparing the polyester may be co-reacted with the polysiloxane to form a block copolymer.

The polyester moiety of the copolymer comprises a polycondensation product of one or more polycarboxylic acids (or acid anhydrides thereof) with one or more polyhydroxy alcohols. Typical examples of such polycarboxylic acids are aliphatic or aromatic acids such as phthalic, isophthalic, pyromellitic, terephthalic, adipic, maleic, fumaric, sebacic, etc.; frequently, monocarboxylic acids such as pelargonic, caproic, lauric, isostearic, benzoic, etc. are added to make the polyester tougher and more flexible. Suitable polyhydroxy alcohols include glycerol, ethylene glycol, propylene glycol, diethylene glycol, dipropylene glycol, trimethylene glycol, pentaerythritol, neopentyl glycol, trimethylol ethane, trimethylol propane, 1,3-butanediol, 1,4-cyclohexanediol, etc. Monohydroxy alcohols such as tridecyl alcohol may also be added if desired.

The selected acids and alcohols are typically heated to a temperature of 140°-220° C., preferably 180°-210° C., in the presence of 0.1 to 0.5 wt.% of an esterification catalyst such as an organotin compound, e.g. dibutyltin dilaurate, for 1-4 hours until the desired hydroxy and acid values are obtained. Typically, the hydroxy value will be in the range of 40-250, preferably 100-150, while the acid value will be in the range of 2-35, preferably 5-20. When the polyester is prepared prior to reaction with the polysiloxane, the molar ratio of polycarboxylic acid to polyhydroxy alcohol will be in the range of about 1:1-1:2, preferably 1:1.4-1:1.6. The resultant polyester is then reacted with the polysiloxane in amounts such that the polysiloxane content of the copolymer will be in the range of 1.5 to 7 wt.%, preferably 1.9 to 5 wt.%, based on the weight of copolymer.

The reaction (of the acid and/or hydroxy groups) of the polyester with the selected polysiloxane is conducted at a temperature in the range of 160° to 230° C., preferably 170° to 210° C., for 1 to 8 hours, until the desired acid value has been achieved. These reaction conditions, particularly the relatively high hydroxyl number and relatively low polysiloxane content of the copolymer, will insure that it is functional in nature and therefore capable of combining with the crosslinking agent and optional reactive diluent.

When a block copolymer is to be prepared, the molar ratio of polycarboxylic acid to polyhydroxy alcohol will be in the same range as described above and the polysiloxane moiety of the block copolymer will be present in the same amount as previously set forth for the graft copolymer. The reaction conditions for preparing the block copolymer are identical to those for preparing the graft copolymer, except that all the monomers are concurrently present. The polyester-polysiloxane copolymer (block or graft) will typically have a number average molecular weight of about 500–6000.

Preferably, the polysiloxane employed in preparing the copolymer is a hydrogen-terminated polyalkylene oxide-modified polymethylsiloxane having a number average molecular weight of about 3,000 to 5,000 and the general formula:

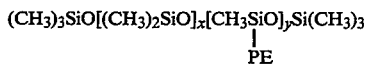

wherein PE is $-CH_2CH_2CH_2O(EO)_m(PO)_n(BO)_qH$ in which EO is ethyleneoxy, PO is propyleneoxy, and BO is butyleneoxy, and m, n and q are independently integers of 0 to 10, and the sum of m, n and q is at least 1, and x is an integer having a value of 0 to about 250 and is y is an integer having a value of 1 to about 500.

The copolymer may be present in the thermosetting printing ink composition in an amount of 15 to 40 wt.%, preferably 25 to 35 wt.%, based on the weight of the composition.

The compositions of the present invention will contain one or more inorganic and/or organic pigments. Typically the pigment content will be in the range of 15 to 70 wt.%, preferably 25 to 60 wt.%, based on the weight of the composition. Examples of suitable inorganic pigments include iron oxide (black, brown or yellow), titanium dioxide and zinc sulphide. Examples of suitable organic pigments include: Violet 3, 15, 32; Blue 1, 15:1, 16, 27, 56; Green 7, 36; Orange 13, 34, 36, 46; Yellow 1, 3, 4, 12, 13, 14, 17, 55, 60, 65, 73, 74, 83, 97, 100, 101; Red 2, 3, 4, 5, 8, 9, 10, 12, 17, 22, 23, 48, 49, 52, 53, 57, 63, 81, 112, 146, 170, 176, 200, 208, 210, 222.

The crosslinking agent is generally present in an amount of 1 to 15 wt.%, preferably 5 to 10 wt.%, based on the weight of the composition. Suitable crosslinking agents include aminoplast, phenolic, epoxy and polyisocyanate resins. The preferable crosslinking agent is an aminoplast resin. Aminoplast resins are a class of thermosetting resins prepared by reacting amido or amidino amines with an aldehyde. Suitable reactants include amines such as urea, alkylated urea, melamine, guanamines, etc. and aldehydes such as glyoxal, formaldehyde, acetaldehyde, etc. The aminoplast resin will typically have an alkoxy (preferably methoxymethyl) content of 2 to 6 and a weight average molecular weight of about 200 to 500, preferably 300 to 400. The preferred crosslinking agent is hexakismethoxymethylmelamine.

The compositions of the present invention also require a curing catalyst comprising a strong inorganic or organic acid or metal salt thereof. Suitable acids are those having ionization constants (i.e. $-\log K$) of less than 5, e.g. acetic and halogenated acetic, benzoic and halogenated benzoic, propionic and halogenated propionic, hydrochloric, hydrofluoric, iodic, phosphoric and alkylated phosphoric, sulfuric, p-toluene sulfonic, alkali metal sulfonates, etc. The preferred curing catalyst is zinc sulfonate. The catalyst is employed in an amount of 0.5 to 6 wt. %, preferably 1 to 4 wt. %, based on the weight of the composition.

The compositions of the present invention desirably contain a diluent to control viscosity and to assist in transferability of the ink to the substrate. Preferably, the diluent is one which is non-volatile at the desired curing temperature of the compositions. The compositions are generally cured at temperatures of about 120° to 350° C. for about 4 seconds to 6 minutes, preferably 180° to 220° C. for 30 seconds to 3 minutes. Volatile, non-reactive diluents are undesirable for environmental and safety reasons and also because such diluents leave bubbles or cracks in the ink coating as they evaporate or they may be trapped between the outer surface of the ink coating and the overprint varnish. The reactive diluent is employed in an amount of 10 to 35 wt. %, preferably 15 to 25 wt. %, based on the weight of the composition.

Examples of suitable reactive diluents are the glycols, glycol ethers and alcohols such as ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether, propylene glycol monophenyl ether, tridecyl alcohol, octyl alcohol, lauryl alcohol, octadecyl alcohol, etc.

The compositions of the present invention desirably contain one or more extenders present in an amount of 1 to 10 wt. %, preferably 2 to 5 wt. %, based on the weight of the composition. Suitable extenders include zinc oxide, lithopone, calcium carbonate, china clay, blanc fixe, alumina hydrate, talc, silica, etc. If desired, one or more synthetic or natural waxes may also be included in the compositions in amounts of up to about 10 wt. %, based on the weight of the composition. Preferred 10 waxes are polyethylene and polytetrafluoroethylene. Preferably, the pH of the ink composition is in the range of 6.5 to 7.5. The pH may be readily adjusted by use of alkanolamines such as ethanolamine, triethanolamine, dibutylaminoethanol and the like.

Polyester A was prepared by reacting 2 moles trimellitic anhydride, 4 moles dipropylene glycol and 1 mole tridecyl alcohol at 180°–200° C. for 2–3 hours in the presence of 0.25 wt. % dibutyltin dilaurate catalyst and 0.003 wt. % anti-foaming agent (10% silicone fluid in toluene), until an acid value of 15–20 was obtained.

Polyester B was prepared by reacting 99.8 wt. % Polyester A and 0.2 wt. % of a polysiloxane at 180° C. for 3 hours and thereafter at 210° C. for 3 hours to produce a polyester having an acid value of 2. The polysiloxane which was used was Union Carbide SILWET ® L-7604, a hydrogen-terminated polyethylene oxide-modified polymethylsiloxane having a molecular weight of 4,000, a specific gravity at 25° C. of 1.063, a cST viscosity at 25° C. of 120, Gardner color of 1 and the general formula:

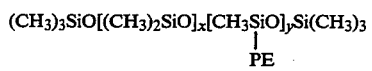

wherein PE=$-CH_2CH_2CH_2O(EO)_m(PO)_n(BO)_qH$ in which EO=ethyleneoxy, PO=propyleneoxy and BO=butyleneoxy, and m is an integer of about 3 to 10, and n and q are 0, and x is an integer having a value of 0 to about 250 and y is an integer having a value of 1 to about 500.

Polyester C was prepared by reacting 95 wt. % Polyester A with 5 wt. % Dow Corning ® Q1-3074, a methoxy-functional polysiloxane having a low molecular weight, a theoretical silicone content of 87 wt. %, a specific gravity at 25° C. of 1.156, a refractive index at 25° C. of 1.504, a cST viscosity at 25° C. of 120, and APHA color of 10. The reaction was carried out at 180° C. for 2 hours until an acid value of 10–12 was obtained.

Polyester D was prepared by reacting 90 wt. % Polyester A with 10 wt. % of Union Carbide SILWET ® L-7604 at 180° C. for a period of 3 hours and thereafter at 210° C. for 3 hours until an acid value of 6 was obtained.

Polyester E was prepared by reacting 85 wt. % Polyester A with 15 wt. % of Dow Corning ® Q1-3074 at 180° C. for 2 hours until an acid value of 10–12 was obtained.

Polyester F was prepared by reacting 1 mole trimethylolpropane with 0.70 mole isophthalic acid and 1.1 moles lauric acid in the presence of 0.1 wt. % dibutyltin dilaurate catalyst at 160°–230° C. for 2–5 hours until an acid value of 10–12 was obtained.

Polyester G was prepared by reacting 2.1 moles 1,4-cyclohexanedimethanol, 1 mole trimellitic anhydride, 0.9 mole tridecyl alcohol in the presence of 0.5 wt. % anti-foam agent and 0.1 wt. % dibutyltin dilaurate catalyst at 150°–210° C. for 2–6 hours until an acid value of 2 to 5 was obtained.

Polyester H was prepared by reacting 95 wt. % Polyester F with 5 wt. % Dow Corning ® Q1-3074 at 180° C. until an acid value of 10–12 was obtained.

Polyester I was prepared by reacting 95 wt. % Polyester G with 5 wt. % Dow Corning ® Q1-3074 at 180° C. until an acid value of 2–5 was obtained.

Polyester J was prepared by reacting 2 moles trimellitic anhydride, 4 moles dipropylene glycol and 1 mole tridecyl alcohol in the presence of 0.25 wt. % dibutyltin dilaurate catalyst and 0.003 wt. % anti-foaming agent (10% silicone fluid in toluene) at 180° C. for about 2 hours until an acid number of 15–20 was obtained. The resultant polyester (95 wt. %) was then reacted with 5 wt. % Union Carbide SILWET ® L-7604 at 180° C. until an acid value of 10–12 was obtained.

Polyester K was prepared by reacting 1. 78 moles isophthalic acid, 0.88 mole adipic acid, 4.08 moles dipropylene glycol and 0.27 mole neopentyl alcohol and 0.20 wt. % dibutyltin dilaurate catalyst at 180°–200° C. for about 2 hours until an acid value of 10–15 was obtained.

Polyester L was prepared by reacting 98. 1 wt. % Polyester K with 1.9 wt. % Union Carbide SILWET ® L-7604 at 180° C. for 2 hours and thereafter at 210° C. for about 5 hours until an acid value of 5–7 was obtained.

Polyester M was prepared by reacting 99.8 wt. % Polyester K with 0.2 wt. % Union Carbide SILWET ® L-7604 at 180° C. for 2 hours and thereafter at 210° C. for about 5 hours until an acid value of 2 was obtained.

Polyester N was prepared in order to repeat Example 1 of U. S. Pat. 4,465,712 (McVie). The polyester was prepared by reacting 70.4 parts trimethylolpropane with 44 parts dimethylterephthalate and 0.11 part dibutyltin dilaurate catalyst at 240° C. for 4–5 hours. 100 parts of the resultant polyester and 150 parts propylphenylsiloxane (Dow Corning ® Z-6018 having a theoretical silicone content of 96.6 wt. %, hydroxyl content of 6.4 wt. %, specific gravity at 25° C. of 1.23 and a softening point of 40° C. ), and 167 parts 2-ethoxyethylacetate and 0.3 part tetrabutyl titanate were reacted at 150° C. for 3 hours and the reaction mixture was cooled to 90° C. At that point, 208 parts n-butanol and 208 parts 2-ethoxyethanol were added to arrive at a solution of 30% solids. To 25 parts of this solution were added 4 parts N-(2-aminoethyl-3-aminopropyl)trimethoxysilane, 0.5 part tetrakis(2-methoxyethoxy) silane and 0.4 part dibutyltin dilaurate and the reaction was held at room temperature for 1.5 hours.

Polyester O was prepared by blending 66.1 parts Polyester K with 3.4 parts xylene and 30.5 parts of an aromatic solvent having an aniline point of 14° C. and a boiling point in the range of 226°–279° C.

Polyester P was prepared by blending 97 parts Polyester K with 1.5 parts xylene and 1.5 parts 2-ethoxyethylacetate.

Polyester O was prepared by reacting 35.1 parts Polyester P, 33.4 parts Dow Corning ® Q1-3074, 28.5 parts 2-ethoxyethylacetate and 0.3 part tetrabutyl titanate at 150° C. for 2 hours. The temperature was then lowered to 110° C. and 2.7 parts n-butanol were added. The reaction mixture was then held at a temperature of 110° C. for 1 hour, cooled to 50° C. and discharged.

Polyester R was prepared by blending 71 parts Polyester with 17.8 parts Polyester Q and 11.2 parts of an aromatic solvent having an aniline point of 14° C. and a boiling point of 226°–279° C.

Polyester S was prepared by blending 66.1 parts Polyester A with 3.4 parts xylene and 30.5 parts of an aromatic solvent having an aniline point of 14° C. and a boiling point of 226°–279° C.

Polyester T was prepared by blending 97 parts Polyester A with 1.5 parts xylene and 1.5 parts 2-ethoxyethylacetate.

Polyester U was prepared by reacting 35.1 parts Polyester T, 33.4 parts Dow Corning ® Q1-3074, 28.5 parts 2-ethoxyethylacetate and 0.3 part tetrabutyl titanate at 150° C. for 2 hours. The temperature was then lowered to 110° C. and 2.7 parts n-butanol were added. The reaction mixture was then held at a temperature of 110° C. for 1 hour, cooled to 50° C. and discharged.

Polyester V was prepared by blending 71 parts Polyester S with 17.8 parts Polyester U , 3.4 parts xylene and 11.2 parts of an aromatic solvent having an aniline point of 14° C. and a boiling point of 226°–279° C.

Polyester W was prepared by reacting 0.98 mole phthalic anhydride, 0.24 mole isophthalic acid, 0.24 mole adipic acid, 1.11 moles neopentylglycol, 0.37 mole 1,6-hexanediol, 0.05 mole trimethylolpropane and 0.1 wt. % lead oxide at 200°–220° C. for about 5 hours until an acid value of 15–20 was obtained.

Polyester X was prepared by blending 66.1 parts Polyester W with 3.4 parts xylene and 30.5 parts of an aromatic solvent having an aniline point of 14° C. and a boiling point of 226°–279° C.

Polyester Y was prepared by reacting 0.30 mole neopentylglycol, 0.15 mole dipropylene glycol, 0.18 mole isophthalic acid, 0.18 mole adipic acid and 0.20 wt. % dibutyltin dilaurate at 180°–220° C. for about 5 hours until an acid number of 30–35 was obtained.

Polyester Z was prepared by reacting 35.1 parts Polyester Y, 33.4 parts Dow Corning ® Q1-3074, 28.5 parts 2-ethoxyethylacetate and 0.3 part tetrabutyl titanate at 150° C. for 2 hours. The temperature was lowered to 110° C. and 2.7 parts n-butanol were added. The mixture was held at 110° C. for 1 hour, cooled to 50° C. and discharged.

Polyester ZZ was prepared by blending 71 parts Polyester W, 17.8 parts Polyester Z, 3.4 parts xylene and 11.2 parts of an aromatic solvent having an aniline point of 14° C. and a boiling point of 226°–279° C.

EXAMPLE 1

A printing ink was prepared by mixing and milling 5 parts Polyester A, 27 parts Pigment Red 200, 8 parts hexakismethoxymethylmelamine, 5 parts zinc sulfonate, 0.4 part dibutylaminoethanol, 3.5 parts talc and 31.1 parts polypropylene glycol.

EXAMPLE 2

A printing ink was prepared by mixing and milling 25 parts Polyester B, 27 parts Pigment Red 200, 8 parts hexakismethoxymethylmelamine, 5 parts zinc sulfonate, 0.4 part dibutylaminoethanol, 3.5 parts talc and 31.1 parts polypropylene glycol.

EXAMPLE 3

A printing ink was prepared by mixing and milling 25 parts Polyester C, 27 parts Pigment Red 200, 8 parts hexakismethoxymethylmelamine, 5 parts zinc sulfonate, 0.4 part dibutylaminoethanol, 3.5 parts talc and 31.1 parts polypropylene glycol.

EXAMPLE 4

A printing ink was prepared by mixing and milling 25 parts Polyester D, 27 parts Pigment Red 200, 8 parts hexakismethoxymethylmelamine, 5 parts zinc sulfonate, 0.4 part dibutylaminoethanol, 3.5 parts talc and 31.1 parts of polypropylene glycol.

EXAMPLE 5

A printing ink was prepared by mixing and milling 25 parts Polyester E, 27 parts Pigment Red 200, 8 parts hexakismethoxymethylmelamine, 5 parts zinc sulfonate, 0.4 part dibutylaminoethanol, 3.5 parts talc and 31.1 parts polypropylene glycol.

EXAMPLE 6

A printing ink was prepared by mixing and milling 25 parts Polyester A, 27 parts Pigment Red 200, 8 parts hexakismethoxymethylmelamine, 5 parts zinc sulfonate, 0.4 part dibutylaminoethanol, 3.5 parts talc and 1.25 parts Dow Corning ® Q1-3074.

A comparison (Table I) of the physical properties and print quality of the inks of Examples 1–6 indicates that the ink of Example 3 (Polyester C) is definitely advantageous over the inks of Examples 1, 2 and 4–6. Such advantages include lower surface tension, improved ink transfer and laydown, increased color strength and better water-borne overprint varnish (OPV) acceptance.

A comparison of Example 3 with Example 1 shows the advantages of the use of the polyester-polysiloxane copolymer over the polyester alone in printing inks.

A comparison of Example 3 with Example 6 shows that the polysiloxane must be reacted with, and not merely mixed with, the polyester in order to achieve the advantages associated with the use of siliconized polyesters in printing inks.

A comparison of Example 3 with Example 2 shows that the use of a polysiloxane in an insufficient amount results in a copolymer which produces a marginally acceptable printing ink, i.e. a printing ink comparable to that of Example 1 which utilized Polyester A.

A comparison of Example 3 with Example 4 and 5 shows that the use of a polysiloxane in excessive amounts results in a copolymer which produces an inferior ink, i.e. a printing ink having an unacceptably high viscosity and high surface tension thereby resulting in poor ink transfer and very poor water-borne overprint varnish acceptability, ("OPV") i.e. laydown and flow.

TABLE I

| Ex. | Surface Tension, dynes/cm$^2$ | Polarity | Color Strength | Shear Viscosity, Pas | OPV |
|---|---|---|---|---|---|
| 1 | 26.21 | 39.52 | standard | 28.52 | standard |
| 2 | 25.70 | 40.12 | −0.25% | 27.42 | equal to standard |
| 3 | 19.70 | 56.49 | +28.99 | 16.82 | better |
| 4 | 45.40 | 10.78 | −5.01% | 32.40 | worse |
| 5 | 46.53 | 8.58 | −7.65% | 36.37 | much worse |
| 6 | 26.54 | 39.33 | +5.15% | 18.81 | worse |

Water-borne overprint varnishes are typically applied on wet substrates using an Anilox roller after the final inking station. The improvement in OPV acceptance, i.e. smoother laydown, resulting from the use of Polyester C (a 5 wt. % polysiloxane modification of the underlying Polyester A) was totally unexpected. Normally, silicones, i.e. polysiloxanes, because of their low surface energies, will repel aqueous coatings. On the other hand, the excessive levels of polysiloxane (i.e. 10 and 15 wt. %) caused a reduction in OPV acceptance, possibly due to free polysiloxane which did not completely react with Polyester A.

EXAMPLE 7

A printing ink was prepared by mixing and milling 30 parts Polyester F with 35 parts carbon black pigment, 8 parts hexakismethoxymethylmelamine, 4 parts zinc sulfonate, 2 parts dibutylaminoethanol, 3.5 parts talc and 17.5 parts polypropylene glycol.

EXAMPLE 8

A printing ink was prepared by mixing and milling 17 parts Polyester A, 17 parts Polyester G, 27 parts phthalocyanine blue pigment, 4 parts hexakismethoxymethylmelamine, 4 parts zinc sulfonate, 1.5 parts dibutylaminoethanol, 4.5 parts talc and 25 parts polypropylene glycol.

EXAMPLE 9

A printing ink was prepared by mixing and milling 30 parts Polyester H, 35 parts carbon black pigment, 8 parts hexakismethoxymethylmelamine, 4 parts zinc sulfonate, 2 parts dibutylaminoethanol, 3.5 parts talc and 17.5 parts polypropylene glycol.

EXAMPLE 10

A printing ink was prepared by mixing and milling 17 parts Polyester D, 17 parts Polyester I, 27 parts phthalocyanine blue pigment, 4 parts hexakismethoxymethylmelamine, 4 parts zinc sulfonate, 1.5 parts dibutylaminoethanol, 4.5 parts talc and 25 parts polypropylene glycol.

TABLE II

| Example | Color Strength | Shear Viscosity (Pas) |
|---|---|---|
| 7 | standard | standard |
| 8 | standard | standard |
| 9 | +7.16% | <standard |
| 10 | +22.66% | <standard |

EXAMPLE 11

A printing ink was prepared by mixing and milling 20 parts Polyester J, 17.30 parts transparent Red Lake C, parts titanium dioxide pigment, 6.35 parts Blue Shade 2B Red, 4.60 parts Dianisidine Orange, 4.0 parts talc, 9.0 parts hexakismethoxymethylmelamine, 1.0 part sodium alkyl sulfosuccinate, 2.0 parts 2-hydroxyethyl cocoimidazoline and 28.75 parts polyalkoxylated polyether.

EXAMPLE 12

A printing ink was prepared by mixing and milling 23.75 parts Polyester K, 17.30 parts transparent Red Lake C, 7.0 parts titanium dioxide pigment, 6.35 parts Blue Shade 2B Red, 4.60 parts Dianisidine Orange, 4.0 parts talc, 9.0 parts hexakismethoxymethylmelamine, 1.0 part sodium alkyl sulfosuccinate, 2.0 parts 2-hydroxyethylcocoimidazoline, 2.0 parts tridecyl alcohol, 3.0 parts n-hexylcarbitol and 20 parts polypropylene glycol.

EXAMPLE 13

A white printing ink was prepared by mixing and milling 43 parts Polyester M, 44 parts titanium dioxide pigment, 3 parts hexakismethoxymethylmelamine, 0.7 part dibutylaminoethanol, 0.2 part optical brightener, 3 parts hydrophilic silica and 6.1 parts polypropylene glycol.

EXAMPLE 14

A printing ink was prepared by mixing and milling 24.20 parts Polyester J, 11.35 parts transparent Red Lake C, 8.65 parts Dianisidine Orange, 5.40 parts Blue Shade 2B Red, 3.0 parts talc, 1.35 parts titanium dioxide pigment, 1.20 parts HR Yellow, 6.50 parts hexakismethoxymethylmelamine, 4.40 parts zinc sulfonate, 0.55 part dibutylaminoethanol, 1.15 parts 2-hydroxyethylcocoimidazoline, 1.35 parts tridecyl alcohol and 28.90 parts polypropylene glycol.

EXAMPLE 15

A printing ink was prepared by mixing and milling 13.08 parts Polyester A, 5.76 parts Polyester F, 6.70 parts Polyester G, 13.32 parts transparent Red Lake C, 8.64 parts Dianisidine Orange, 5.40 parts Blue Shade 2B Red, 3.03 parts talc, 1.32 parts titanium dioxide pigment, 1.19 parts HR Yellow, 6.50 parts hexakismethoxymethylmelamine, 4.38 parts zinc sulfonate, 1.14 parts 2-hydroxyethyl cocoimidazoline, 0.55 part dibutylaminoethanol and 28.94 parts polypropylene glycol.

EXAMPLE 16

A white printing ink was prepared by mixing and milling 43 parts Polyester K, 44 parts titanium dioxide pigment, 3 parts hexakismethoxymethylmelamine, 0.7 part dibutylaminoethanol, 0.2 part optical brightener, 3 parts hydrophilic silica and 6.1 parts polypropylene glycol.

EXAMPLE 17

A white printing ink was prepared by mixing and milling 43 parts Polyester L, 43 parts titanium dioxide pigment, 3 parts hexakismethoxymethylmelamine, 0.7 part dibutylaminoethanol, 0.2 part optical brightener, 3 parts hydrophilic silica and 6.1 parts polypropylene glycol.

TABLE III

| Ex. | Shear Viscosity @ $100^{sec-1}$ | Shear Viscosity @ $1200^{sec-1}$ | Surface Tension (dynes/cm$^2$) | Polarity, % |
| --- | --- | --- | --- | --- |
| 11 | 13.31 | 3.91 | 21.84 | 57.73 |
| 12 | 13.54 | 4.16 | 28.05 | 36.93 |
| 13 | 8.10 | 4.35 | 23.05 | 47.26 |
| 14 | 9.14 | 3.40 | 27.09 | 41.34 |
| 15 | 10.66 | 4.31 | 30.76 | 24.90 |
| 16 | 8.0 | 4.41 | 23.02 | 47.08 |
| 17 | 7.5 | 4.17 | 20.0 | 50.19 |

The data in Table III indicate that the printing inks of Examples 11, 14 and 17 have a lower shear viscosity and surface tension due to better pigment-wetting properties conferred by the siliconized polyesters. As a result, the printing inks of Examples 11, 14 and 17 exhibited superior results in respect to rheology, flow, transfer, laydown, color strength and gloss when used for the imprinting of cans at print speeds of 1200-1600 cans per minute.

EXAMPLE 18

Examples 2 and 13 above were repeated using Polyester N instead of Polyesters B and M, respectively. Due to the very low viscosity of Polyester N, the resultant inks could not be used for imprinting metal containers.

EXAMPLE 19

A white printing ink was prepared by mixing and milling 49.1 parts Polyester R, 44 parts titanium dioxide pigment, 3 parts hexakismethoxymethylmelamine, 0.7 part dibutylaminoethanol, 0.2 part optical brightener and 3 parts hydrophilic silica.

EXAMPLE 20

A printing ink was prepared by mixing and milling 47.75 parts Polyester V, 17.30 parts transparent Red Lake C, 7.0 parts titanium dioxide pigment, 6.35 parts Blue Shade 2B Red, 4.60 parts Dianisidine Orange, 4 parts talc, 9.0 parts hexakismethoxymethylmelamine, 1.0 part sodium alkyl sulfosuccinate, 2.0 parts 2-hydroxyethylcocoimidazoline and 1.0 part polypropyleneglycol.

EXAMPLE 21

A white printing ink was prepared by mixing and milling 49.1 parts Polyester ZZ, 44 parts titanium dioxide pigment, 3 parts hexakismethoxymethylmelamine, 0.7 part dibutylaminoethanol, 0.2 part optical brightener and 3 parts hydrophilic silica.

EXAMPLE 22

A printing ink was prepared by mixing and milling 47.75 parts Polyester ZZ, 17.30 parts transparent Red Lake C, 7.0 parts titanium dioxide pigment, 6.35 parts Blue Shade Red 2B, 4.60 parts Dianisidine Orange, 4 parts talc, 9.0 parts hexakismethoxymethylmelamine, 1.0 part sodium alkyl sulfosuccinate, 2.0 parts 2-hydroxyethylcocoimidazoline and 1.0 part polypropyleneglycol.

TABLE IV

| Ex. | Shear Viscosity @ $100^{sec-1}$ | Shear Viscosity @ $1200^{sec-1}$ | Surface Tension (dynes/cm$^2$) | Polarity, % |
| --- | --- | --- | --- | --- |
| 11 | 13.31 | 3.91 | 21.84 | 57.73 |
| 12 | 13.54 | 4.16 | 28.05 | 36.93 |
| 20 | 10.89 | 4.32 | 34.00 | 21.05 |
| 22 | 12.21 | 4.01 | 33.23 | 29.00 |

TABLE IV-continued

| Ex. | Shear Viscosity @ $100^{sec-1}$ | Shear Viscosity @ $1200^{sec-1}$ | Surface Tension (dynes/cm$^2$) | Polarity, % |
|---|---|---|---|---|
| 16 | 8.0 | 4.41 | 23.02 | 47.08 |
| 17 | 7.5 | 4.17 | 20.00 | 50.19 |
| 19 | 1.96 | 0.68 | 25.52 | 44.72 |
| 21 | 2.88 | 1.73 | 28.49 | 30.46 |

The data in Table IV indicate that the ink compositions of the prior art corresponding to Examples 20 and 22 have higher surface tensions and lower polarity than either the composition of the present invention (Example 11) or the standard ink composition (Example 2). The higher surface tensions and lower polarities of Examples 20 and 22 manifest themselves in poor printability and poor ink transfer as well as poor overprint varnish acceptability, i.e. ink laydown.

The data in Table IV further indicate that prior art ink compositions corresponding to Examples 19 and 21 have exceptionally low shear viscosities while having higher surface tensions and lower polarities than those of Example 16 (standard) or Example 17 (present invention). Thus the siliconized polyesters of the present invention afforded inks which exhibited superior results in respect to rheology, ink transfer, flow and laydown in comparison to analogous prior art ink compositions.

What is claimed is:

1. A thermosetting printing ink composition comprising:
   (a) a copolymer of a thermosettable polyester and a polysiloxane comprising a hydrogen-terminated polyalkylene oxide-modified polymethylsiloxane having a number average molecular weight of about 3,000 to 5,000 and the general formula:

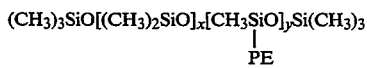

wherein PE=—CH$_2$CH$_2$CH$_2$O(EO)$_m$(PO)$_n$(BO)$_q$H in which EO=ethyleneoxy, PO=propyleneoxy and BO=butyleneoxy, and m, n and q are independently integers of 0 to 10, and the sum of m, n and q is at least 1, x is an integer having a value of 0 to about 250 and y is an integer having a value of 1 to about 500, and the polysiloxane content of the copolymer is in the range of 1.9 to 5 wt. %, based on the weight of the copolymer;
   (b) a pigment;
   (c) a crosslinking agent; and
   (d) a curing catalyst comprising a strong acid or metal salt thereof.

2. The composition of claim 1 wherein the copolymer has an acid value of about 2 to 35 and a hydroxy value of about 40 to 250.

3. The composition of claim 1 wherein the copolymer is present in an amount of about 15 to 40 wt. %, based on the weight of the composition.

4. The composition of claim 1 wherein the pigment is present in an amount of about 20 to 70 wt. %, based on the weight of the composition.

5. The composition of claim 1 wherein the crosslinking agent is present in an amount of about 1 to 15 wt. %, based on the weight of the composition.

6. The composition of claim 1 wherein the crosslinking agent is selected from the group consisting of aminoplast resins, phenolic resins, epoxy resins and polyisocyanate resins.

7. The composition of claim 6 wherein the crosslinking agent comprises hexakismethoxymethylmelamine.

8. The composition of claim 1 wherein the catalyst is present in an amount of about 0.5 to 6 wt. %, based on the weight of the composition.

9. The composition of claim 1 further comprising a reactive diluent.

10. The composition of claim 9 wherein the reactive diluent is present in an amount of about 10 to 35 wt. %, based on the weight of the composition.

11. The composition of claim 9 wherein the reactive diluent comprises a glycol, glycol ether or alcohol selected from the group consisting of ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether, propylene glycol monophenyl ether, tridecyl alcohol, octyl alcohol, lauryl alcohol and octadecyl alcohol.

* * * * *